(12) United States Patent
Chavarria Garcia

(10) Patent No.: US 12,377,982 B2
(45) Date of Patent: Aug. 5, 2025

(54) AIRCRAFT SEAT DESIGN WITH MOUNTABLE FOOD TRAY

(71) Applicant: Safran Seats USA LLC, Gainesville, TX (US)

(72) Inventor: Daniel Abraham Chavarria Garcia, Chihuahua (MX)

(73) Assignee: Safran Seats USA LLC, Gainesville, TX (US)

( * ) Notice: Subject to any disclaimer, the term of this patent is extended or adjusted under 35 U.S.C. 154(b) by 146 days.

(21) Appl. No.: 18/037,513

(22) PCT Filed: Dec. 18, 2020

(86) PCT No.: PCT/US2020/066156
§ 371 (c)(1),
(2) Date: May 17, 2023

(87) PCT Pub. No.: WO2022/132177
PCT Pub. Date: Jun. 23, 2022

(65) Prior Publication Data
US 2023/0415898 A1    Dec. 28, 2023

(51) Int. Cl.
*B64D 11/06* (2006.01)
(52) U.S. Cl.
CPC ................ *B64D 11/0638* (2014.12)
(58) Field of Classification Search
CPC .................................. B64D 11/0638
USPC ........................ 297/169, 163, 146
See application file for complete search history.

(56) References Cited

U.S. PATENT DOCUMENTS

| | | | |
|---|---|---|---|
| 2,807,513 A | 9/1957 | Stein | |
| 3,877,603 A | 4/1975 | Holz | |
| 3,899,982 A * | 8/1975 | Fetzek | A47B 31/06 312/246 |
| 4,174,669 A * | 11/1979 | Lalonde | A47B 31/06 108/45 |
| 4,776,485 A | 10/1988 | Brennan | |
| 4,886,231 A * | 12/1989 | Doerksen | A47B 23/043 248/205.2 |

(Continued)

FOREIGN PATENT DOCUMENTS

| | | |
|---|---|---|
| DE | 102012105089 U1 | 1/2013 |
| DE | 202012105089 U1 | 1/2013 |

(Continued)

OTHER PUBLICATIONS

International Patent Application No. PCT/US2020/066156, International Preliminary Report on Patentability, dated Jun. 29, 2023.

(Continued)

*Primary Examiner* — Jose V Chen
(74) *Attorney, Agent, or Firm* — Kilpatrick Townsend & Stockton LLP

(57) ABSTRACT

Described is a mountable tray table assembly having a base attachable to a seat back of a passenger seat via an attachment mechanism. The base may include an opening for receiving a tray table and a projection for retaining the tray table within the base. The attachment mechanism may maintain the base at a set angle relative to a floor of a vehicle when the seat back is in an upright position and a reclined position.

19 Claims, 8 Drawing Sheets

(56) References Cited

U.S. PATENT DOCUMENTS

| | | | | |
|---|---|---|---|---|
| 5,038,688 | A * | 8/1991 | Permenter | A47G 19/08 248/444 |
| 5,092,652 | A * | 3/1992 | Macaluso | A47B 13/16 108/26 |
| 5,810,316 | A * | 9/1998 | Eby | A47B 23/043 248/456 |
| 5,931,527 | A * | 8/1999 | D'Onofrio | B60N 3/004 297/188.05 |
| 7,740,312 | B2 | 6/2010 | Johnson, Jr. | |
| 9,352,840 | B2 | 5/2016 | Schultheis | |
| 9,415,874 | B2 | 8/2016 | Curtis et al. | |
| 10,272,166 | B2 | 4/2019 | Mackin et al. | |
| 2003/0230674 | A1 | 12/2003 | Weekly | |
| 2005/0178297 | A1 * | 8/2005 | Pipkin | A47B 23/00 108/44 |
| 2007/0113757 | A1 | 5/2007 | Lilly | |
| 2007/0283855 | A1 * | 12/2007 | Pozzi | A47B 23/043 108/44 |
| 2010/0060044 | A1 | 3/2010 | Pozzi et al. | |
| 2011/0095577 | A1 * | 4/2011 | Kennard | G09F 23/06 297/146 |
| 2013/0093220 | A1 * | 4/2013 | Pajic | H02J 50/10 297/163 |
| 2013/0264298 | A1 * | 10/2013 | Shih | F16M 13/00 211/26 |
| 2013/0314861 | A1 * | 11/2013 | Burford | F16M 11/10 361/679.01 |
| 2015/0068434 | A1 | 3/2015 | Pajic | |
| 2016/0009394 | A1 * | 1/2016 | Felske | B64D 11/0627 297/163 |
| 2016/0039525 | A1 * | 2/2016 | Pajic | G06F 1/1632 108/44 |
| 2016/0298808 | A1 * | 10/2016 | Boyer | F16M 11/10 |
| 2017/0001727 | A1 | 1/2017 | Schuler et al. | |
| 2020/0172250 | A1 * | 6/2020 | Drenzeck | B64D 11/0636 |
| 2023/0182632 | A1 * | 6/2023 | Mansouri | F16M 11/10 297/163 |
| 2023/0219688 | A1 * | 7/2023 | Lopez | B64D 11/0638 297/124 |

FOREIGN PATENT DOCUMENTS

| | | |
|---|---|---|
| GB | 1254851 | 11/1971 |
| GB | 2158694 A | 11/1985 |
| GB | 2498362 A | 7/2013 |
| JP | H0119204 A | 5/1989 |
| WO | 2016161468 A1 | 10/2016 |

OTHER PUBLICATIONS

International Patent Application No. PCT/US2020/066156, International Search Report and Written Opinion, dated Sep. 10, 2021.
European Application No. 20842642.9, Office Action mailed on Oct. 11, 2024, 7 pages.

* cited by examiner

AIRCRAFT SEAT DESIGN WITH MOUNTABLE FOOD TRAY

FIELD OF THE INVENTION

The field of the invention relates to tray tables, in particular for use with passenger seats.

BACKGROUND

Many passenger seats such as those on passenger aircraft, buses, trains, and the like are equipped with foldable tray tables. The tray tables may be used for eating, working, or for supporting small items during transport. The tray tables are configured to be used during transport and stowed during taxi, takeoff, landing, and other dangerous flight conditions. Moreover, passenger flights have been seen as a way of commodity transportation, and as is, traditionally you will likely find food and drink services during flight. For this purpose, passenger seats typically come with a tray table installed on the seat, as a way for passengers to rest their food trays on top of the tray table along with the cups. This conventional approach often leads to wasted weight and volume as the food tray covers most of the usable space of the tray table.

Traditionally, food trays are stowed inside the aircraft on food trolleys and are preloaded with food that may be served during flight. Theses food trays often have standard sizes in order for the food trolleys to maximize the number of food trays.

As passenger space in aircraft cabins is often limited, especially in economy class seats, space maximizing the living space is of great priority. Conventional tray tables not only take up considerable space but also represent additional surfaces to be cleaned. Therefore, a tray table mounting assembly that maximizes living space and eliminates additional surfaces requiring disinfection may be desired.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments, a mountable tray assembly includes a base attachable to a seat back of a passenger seat via an attachment mechanism that maintains the base at a set angle relative to a floor of a vehicle when the seat back is in an upright position and a reclined position. The base may include a first side and a second side opposite the first side, and an opening for receiving the tray table. The opening may include at least one adjustable projection positioned within the opening. When the tray table is positioned within the opening, the adjustable projection may contact an end of the tray table.

In some embodiments, the attachment mechanism comprises a rotating cylinder mount.

In some embodiments, the mountable tray table assembly further includes at least retractable arm extending from the base for supporting the tray table.

In some embodiments, when the tray table is positioned within the opening, less than half of the tray table may be within the opening.

In some embodiments, the adjustable projection includes a sloped end and has a retracted configuration and an extended configuration. In the extended configuration, the adjustable projection may extend downward within the opening. When the end of the tray table contacts the sloped end, the adjustable projection may move toward the retracted configuration. When the end of the tray table moves past the sloped end, the adjustable projection may return to the extended configuration to retain the tray table within the opening. The adjustable projection may be biased to the extended configuration.

According to certain embodiments, a mountable tray assembly includes a base attachable to a seat back of a passenger seat via an attachment mechanism. The base may include a horizontal portion, a vertical portion, and at least one projection extending from the vertical portion. When the tray table is positioned within the base, a bottom surface of the tray table may contact the horizontal portion and a ledge of the tray table may contact the at least one projection.

In some embodiments, the projection may include a first projection and a second projection. The first projection may be positioned at a first end of the base and the second projection may be positioned at a second end of the base opposite the first end.

In some embodiments, the projection includes a downward projecting portion. When the tray table is positioned within the base, the ledge of the tray table may contact the downward projecting portion.

In some embodiments, the horizontal portion extends a first distance from the vertical portion and the projection extends a second distance from the vertical portion such that the first distance is greater than the second distance.

In some embodiments, when the tray table is positioned within the base, the horizontal portion contacts less than half of the bottom surface of the tray table.

In some embodiments, when the tray table assembly is positioned within the base, a rear end of the tray table between a first side and a second side of the tray table is exposed.

According to certain embodiments, a mountable tray assembly includes a base attachable to a seat back of a passenger seat via an attachment mechanism. The base may include an upper surface, a first side and a second side opposite the first side, and at least one adjustable projection. The adjustable projection may include a vertical portion having a first end and a second end and a horizontal portion extending from the first end. The adjustable projection may be positioned within a recess formed on each of the first and second sides of the base. When the tray table is positioned within the base, a bottom surface of the tray table may contact the upper surface of the base and a side of the tray table may be positioned between the horizontal portion of the adjustable projection and the upper surface of the base.

In some embodiments, the adjustable projection includes a retracted configuration and an extended configuration. In the retracted configuration, the at adjustable projection may be positioned within the recess such that an upper surface of the horizontal portion is flush with the upper surface of the base. In the extended configuration, the projection may be raised with respect to the upper surface of the base for receiving the tray table.

In some embodiments, the adjustable projection is slidably coupled to the base such that the at least one adjustable projection slides in a vertical direction between the retracted configuration and the extended configuration.

In some embodiments, when the tray table is positioned within the base, the side of the tray contacts the vertical portion of the at least one adjustable projection and an upper edge of the side of the tray table contacts the horizontal portion of the at least one adjustable projection.

In some embodiments, when the tray table is positioned within the base, the horizontal portion contacts less than half of the bottom surface of the tray table.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide mountable tray assemblies for passenger seats. While the tray table assemblies are discussed for use with aircraft seats, they is by no means so limited. Rather, embodiments of the tray table assemblies may be used in passenger seats or other seats of any type or otherwise as desired.

According to certain embodiments, a mountable tray table assembly includes a base for receiving a tray table, and the tray table is removable from the base as desired. In certain embodiments, the base of the tray table assembly may be supported on a passenger seat such that the tray table may be selectively removed from or supported on the passenger seat.

Figure 1:
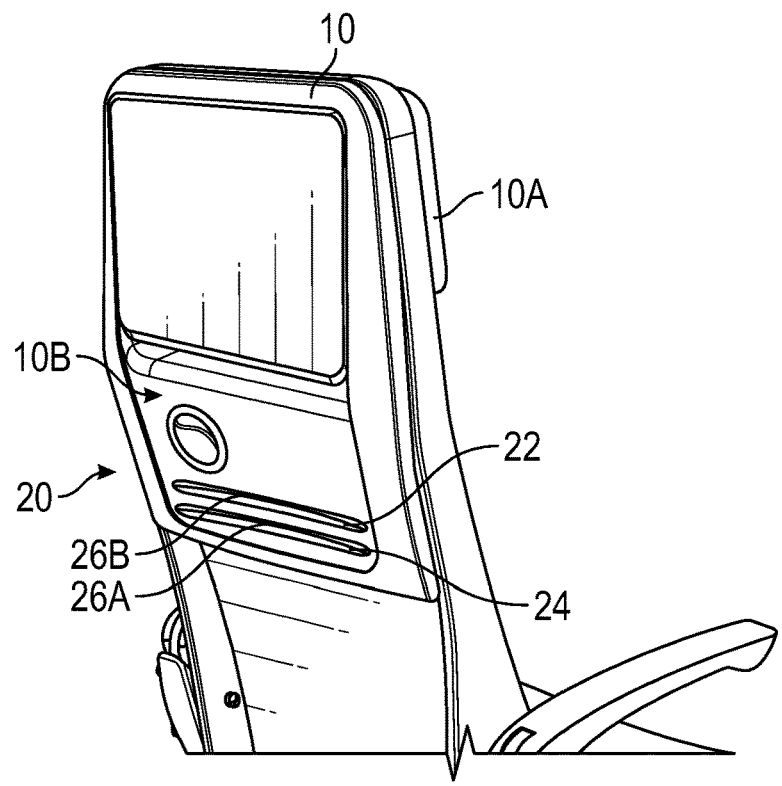
FIG. 1 is a perspective view of a passenger seat onto which a tray table assembly can be mounted according to certain embodiments.
Figure 2:
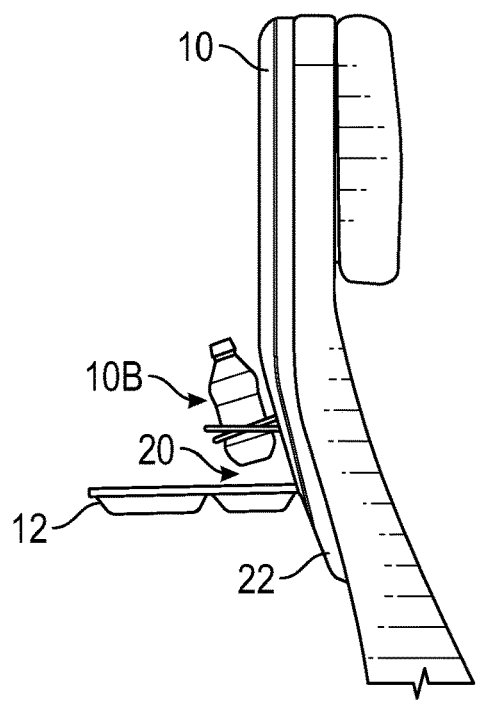
FIG. 2 is a side view of the passenger seat of FIG. 1 with a tray table mounted to the seat back.

As illustrated in FIGS. 1-2, a passenger seat 10 may generally include a seat back 10A and having an amenities zone 10B (which may include features such as, but not limited to, a cup holder, a literature pocket, PED holder, amenities holder, etc.) on a rear surface of the seat back 10A. In certain embodiments, a tray table assembly 20 may support a tray table 12 on the seat back 10A beneath the amenities zone 10B so that a passenger may access the amenities zone 10B while the tray table 12 is supported by the seat back 10A.

In various embodiments, the tray table assembly 20 includes a base 22 that is supported on the passenger seat 10. In certain embodiments, the base 22 is supported on the seat back 10A, although it need not be in other embodiments. The base 22 includes a receiving area 24 that selectively receives and/or otherwise engages the tray table 12 to support the tray table 12 relative to the passenger seat 10. The receiving area 24 may include various suitable devices, mechanisms, structures, or combinations thereof for selectively receiving and engaging the tray table 12. In certain embodiments, the tray table 12 may be removable from and/or supported by the base 22 as desired.

In the embodiment of FIGS. 1 and 2, the receiving area 24 includes two slots 26A-B that selectively engage a portion of the tray table 12. In the embodiment of FIGS. 1 and 2, the orientation of the receiving area 24 relative to the seat back 10A may optionally be fixed. In certain aspects, at least a portion of the edge of the tray table 12 may be at least partially received in one of the slots 26A-B to support the tray table 12. While two slots 26A-B are illustrated, the number of slots should not be considered limiting on the disclosure. Optionally when the base 22 includes more than one slot, the slots may be provided at different angles or orientations such that the base 22 can support a tray table 12 when the seat back 10A is in various positions (e.g., upright, reclined, etc.). In one non-limiting example, the slot 26A may be angled such that the slot 26A can support the tray table 12 while the seat back 10A is in an upright position, and the slot 26B may be angled at a different angle such that the slot 26B can support the tray table 12 while the seat back 10A is in a reclined position.

Figure 3A:
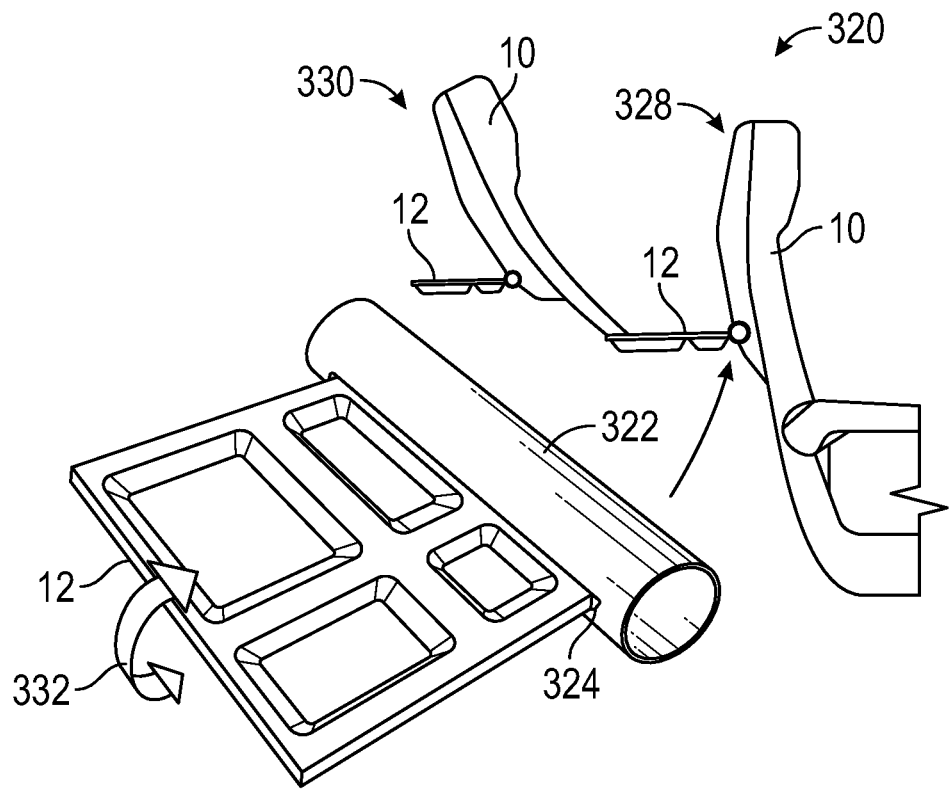
FIG. 3A is a perspective view of a tray table assembly according to certain embodiments.
Figure 3B:
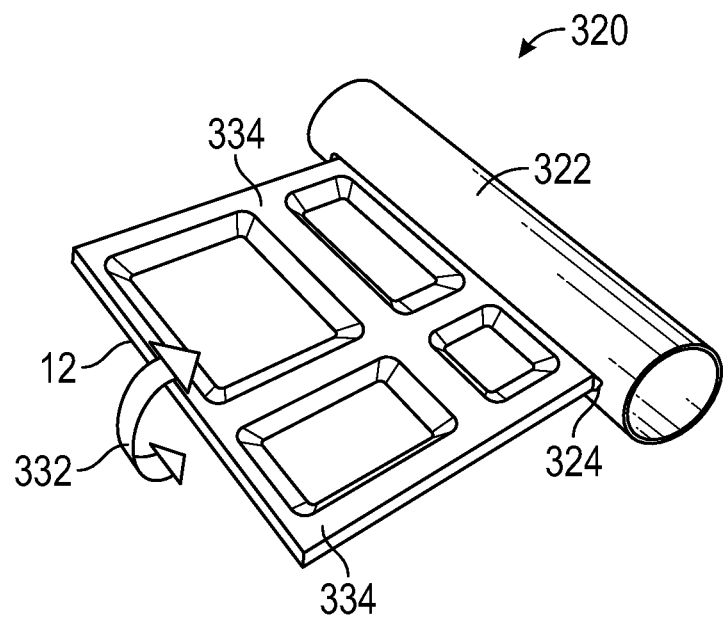
FIG. 3B another perspective view of the tray table assembly of FIGS. 3A-3B with retractable arms.

FIGS. 3A-3B illustrate another example of a tray table assembly 320 that is similar to the tray table assembly 20 and includes a base 322 having a receiving area 324. Similar to the tray table assembly 20, the base 322 of the tray table assembly 320 is supported on the seat back 10A. However, compared to the tray table assembly 20, the base 322 of the tray table assembly 320 is rotatable relative to the seat back 10A (represented by arrow 332) such that an orientation of the receiving area 324 relative to the seat back 10A is adjustable. The base 322 may include various suitable mechanisms or devices as desired such that the base 322 is rotatable. In the non-limiting example of FIGS. 3A-3B, the base 322 includes a rotating cylinder mount. In certain aspects, the adjustable orientation of the receiving area 324 may allow for a general orientation of the tray table 12 supported by the tray table assembly 320 to be maintained. See, e.g., upright orientation 328 compared to reclined orientation 330 in FIG. 3A.

Optionally, and as illustrated in FIG. 3B, the tray table assembly 320 may include one or more retractable arms 334 which may be utilized to further support the tray table 12 when the tray table 12 is supported at the receiving area 324.

In FIG. 3A, the retractable arm(s) 334 are omitted, and the base 322 supports the tray table 12. When included, he retractable arms 334 may be movable between a retracted configuration and an extended configuration via various suitable devices or mechanisms as desired. In certain embodiments, in the retracted configuration, the retractable arms 334 are disposed within or proximate the base 322, and in the extended configuration, the retractable arms 334 extend away from the base 322 for supporting the tray table 12. FIG. 3B illustrates the retractable arms 334 in the extended configuration. While the retractable arms 334 are described with respect to the tray table assembly 320, the retractable arms may be used with any tray table assembly described herein.

Figure 4A:
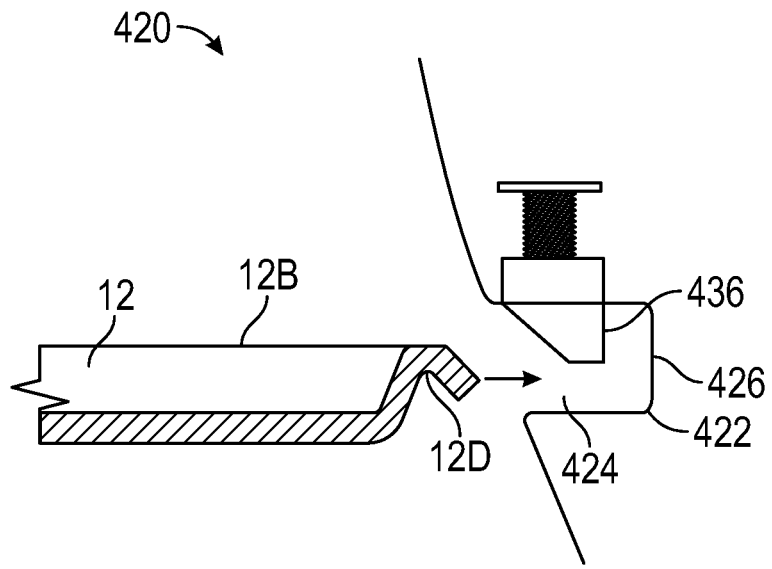
FIGS. 4A-4B are side views of an opening of the tray table assembly of FIGS. 3A-3B.
Figure 4B:
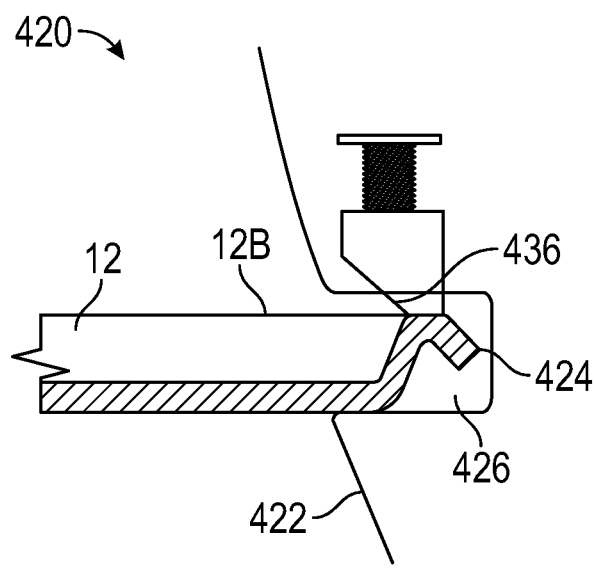

FIGS. 4A-4B illustrate another example of a tray table assembly 420 that is similar to the tray table assembly 20 and includes a base 422 having a receiving area 424. Similar to the tray table assembly 20, the tray table assembly 420 includes a slot 426 that selectively receives, engages, and supports the tray table 12. Compared to the tray table assembly 20, the tray table assembly 420 also includes one or more adjustable projections 436 that selectively engage the tray table 12 when the tray table is at least partially positioned in the slot 426. In certain embodiments, the adjustable projection 436 is movable relative to the slot 426. As best illustrated in FIGS. 4A-4B, the adjustable projection 436 may have an extended configuration (FIG. 4A) and a retracted configuration (FIG. 4B). Optionally, the adjustable projection 436 may be biased towards one of the configurations via various suitable biasing mechanisms as desired. In some cases, the adjustable projection 436 may be biased towards the extended configuration. In various aspects, biasing the adjustable projection 436 may improve the connection between the adjustable projection 436 and the tray table 12 and/or maintain contact between the adjustable projection 436 and the tray table 12. In one non-limiting example, the adjustable projection 436 may be biased via a spring force of a spring mechanism and, in response to a force (e.g., insertion of the tray table 12), the spring mechanism may retract to the retracted configuration.

In use, the tray table 12 may be inserted into the slot 426 of the base 422. When the tray table 12 is inserted into the slot 426, a rear portion 12B of the tray table 12 may contact the adjustable projection 436. In particular, a raised edge or ledge 12D of the tray table 12 may contact the adjustable projection 436. As the raised edge or ledge 12D engages the adjustable projection 436, the adjustable projection 436 may begin to move from the extended configuration to the retracted configuration. The raised edge or ledge 12D may continue to engage the adjustable projection 436 until the raised edge or ledge 12 has sufficiently passed adjustable projection 436. The adjustable projection 436 biased towards the extended configuration may retain the tray table 12 within the slot 426. Thus, when the tray table 12 is positioned within the slot 426, the adjustable projection 436 may contact the rear portion 12B of the tray table 12. Feedback to the passenger may be audible or/and visible such that the feedback may communicate that the tray table 12 is locked and/or secured. To remove the tray table 12 from the base 422, a user may tilt the tray table 12 such that the rear portion 12B dips downward within the slot 426 until the raised edge or ledge 12D is sufficiently below the adjustable projection 436. When the rear portion 12B is sufficiently below the adjustable projection 436, the user may remove the tray table 12 from the slot 426. In some examples, the tray table 12 may include an interface mechanism such as a leaver, button or any other suitable release mechanism, wherein the passenger may activate the interference mechanism in order to raise and/or remove the interface/locking mechanism.

Figure 5A:
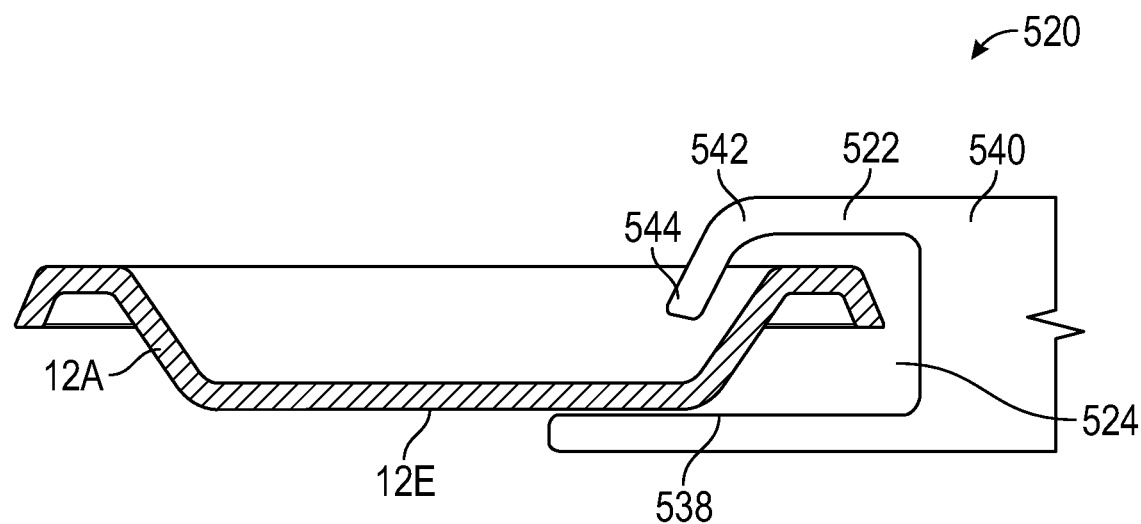
FIGS. 5A-5B are views of a tray table assembly according to further embodiments.
Figure 5B:
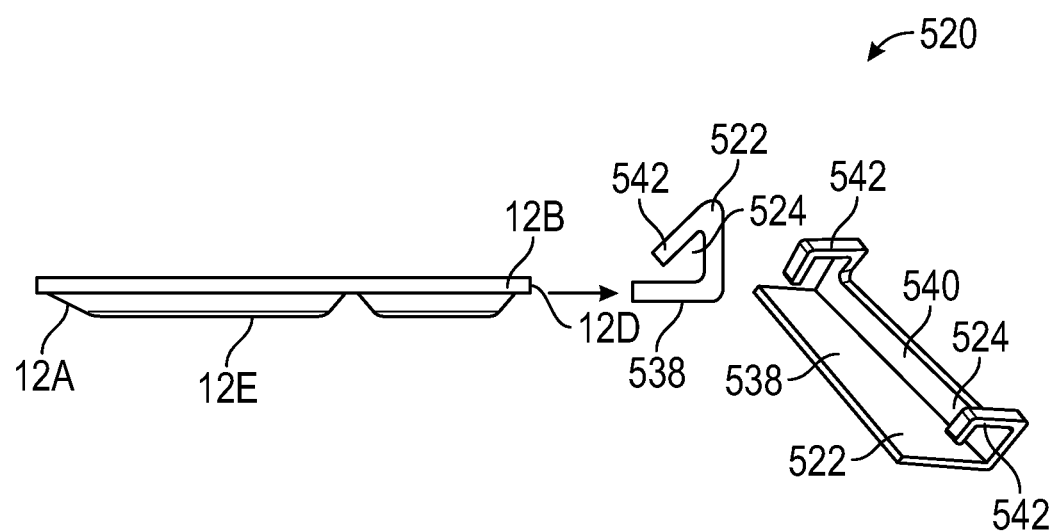

FIGS. 5A-5B illustrate another example of a tray table assembly 520 that is similar to the tray table assembly 20 and includes a base 522 having a receiving area 524. Compared to the base 22, the base 522 of the tray table assembly 520 includes a horizontal portion 538, a vertical portion 540, and one or more projections 542. In some embodiments, as illustrated in FIG. 5B, the tray table assembly 30 includes two projections 542 positioned on first and second sides of the base 522. However, the number, size or shape of the projections 542 should not be considered limiting on the disclosure.

In certain embodiments, The horizontal portion 538 may extend a first distance from the vertical portion 540 at a lower end of the vertical portion 540, and the projection(s) 542 may extend a second distance from the vertical portion 540 at an upper end of the vertical portion 540 that is opposite the lower end of the vertical portion 540. Optionally, the first distance may be greater than the second distance such that the horizontal portion 538 extends further in a direction from the from the vertical portion 540 than the projection(s) 542.

In some embodiments, each projection 542 may further include a downward projecting portion 544 that extends towards the horizontal portion 538. As illustrated in FIGS. 5A-5B, the downward projection portion 544 may be spaced apart from the horizontal portion 538 such that at least a portion of the tray table 12 may be received between the downward projecting portion 544 and the horizontal portion 538. As best illustrated in FIG. 5A, in certain aspects, the downward projecting portion 544 may extend towards the horizontal portion 538 such that a portion of the tray table 12 may be retained between the downward projecting portion 544 and the vertical portion 540, which may assist with securing and positioning the tray table 12 on the base 522.

To install the tray table 12 on the tray table assembly 520, the tray table 12 may be tilted such that the rear portion 12B is sufficiently beneath the downward projecting portion 544. Once the rear portion 12B is able to clear the downward projecting portion 544, a user may continue move the tray table 12 toward the vertical portion 540 and, once the rear portion 12B is proximate the vertical portion 540, the user may tilt the tray table 12 to a horizontal portion such that a bottom surface 12E of the tray table 12 is at least partially supported by the horizontal portion 538. Optionally, when the tray table 12 is positioned within the receiving area 524 of the base 522, the bottom surface 12E of the tray table 12 may be positioned on the horizontal portion 538 such that the rear portion 12B is positioned proximate the vertical portion 540. In some cases, the raised edge or ledge 12D may optionally contact the projection 542. Optionally, the raised edge or ledge 12D may contact the downward projection portion 544. To remove the tray table 12 from the tray table assembly 520, the user may perform the operations described above in reverse. In other words, the user may tilt the tray table 12 such that the rear portion 12B is sufficiently beneath the downward projecting portion 544 and pull the tray table 12 away from the vertical portion 540.

Figure 6A:
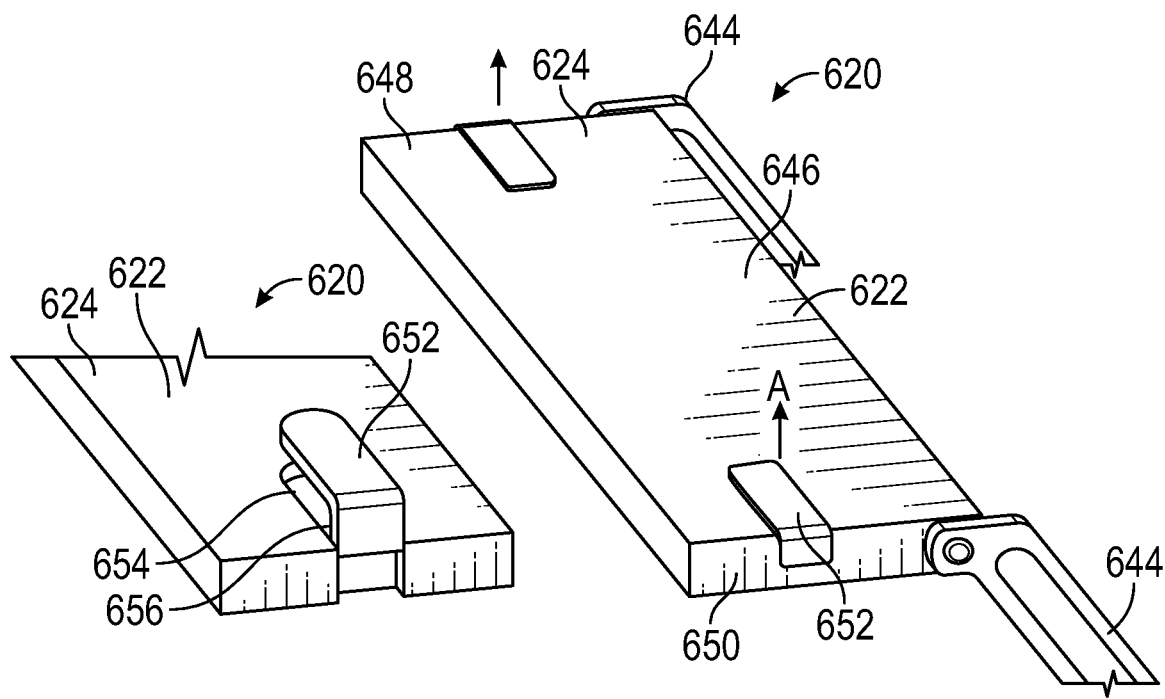
FIGS. 6A-6B are views of a tray table assembly according to further embodiments.
Figure 6B:
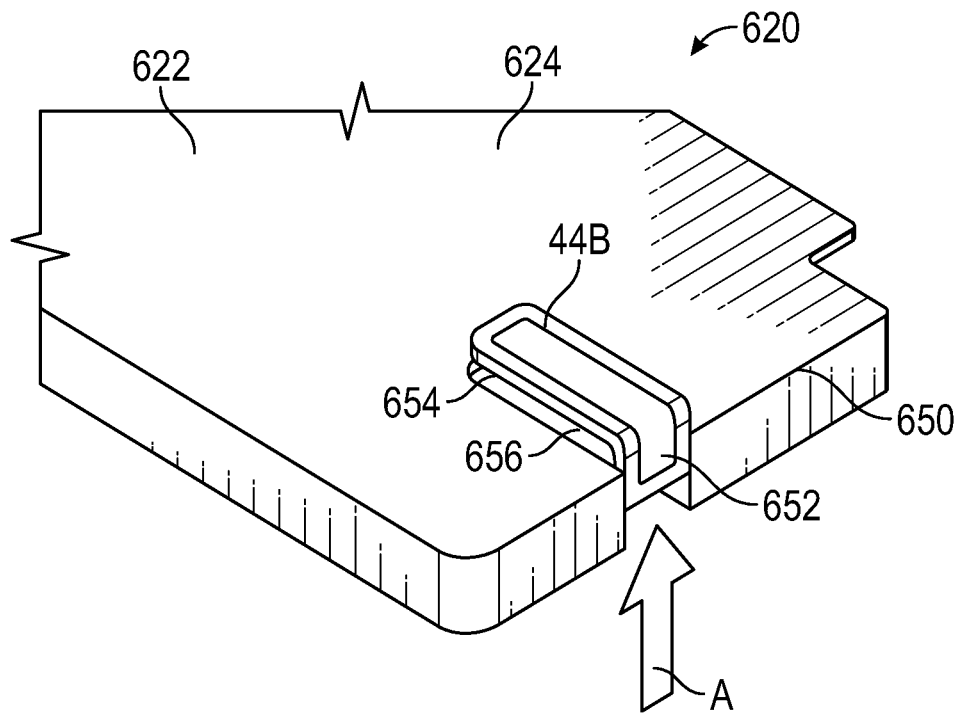
Figure 7:
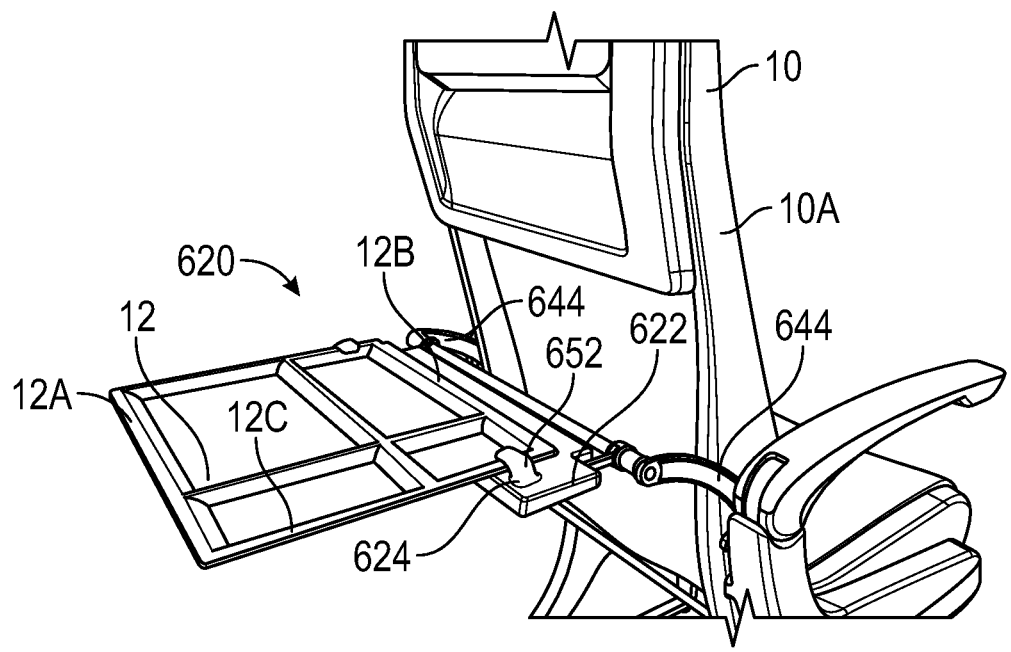
FIG. 7 is a perspective view of the tray table assembly of FIGS. 6A-6B with a tray table.
Figure 8:
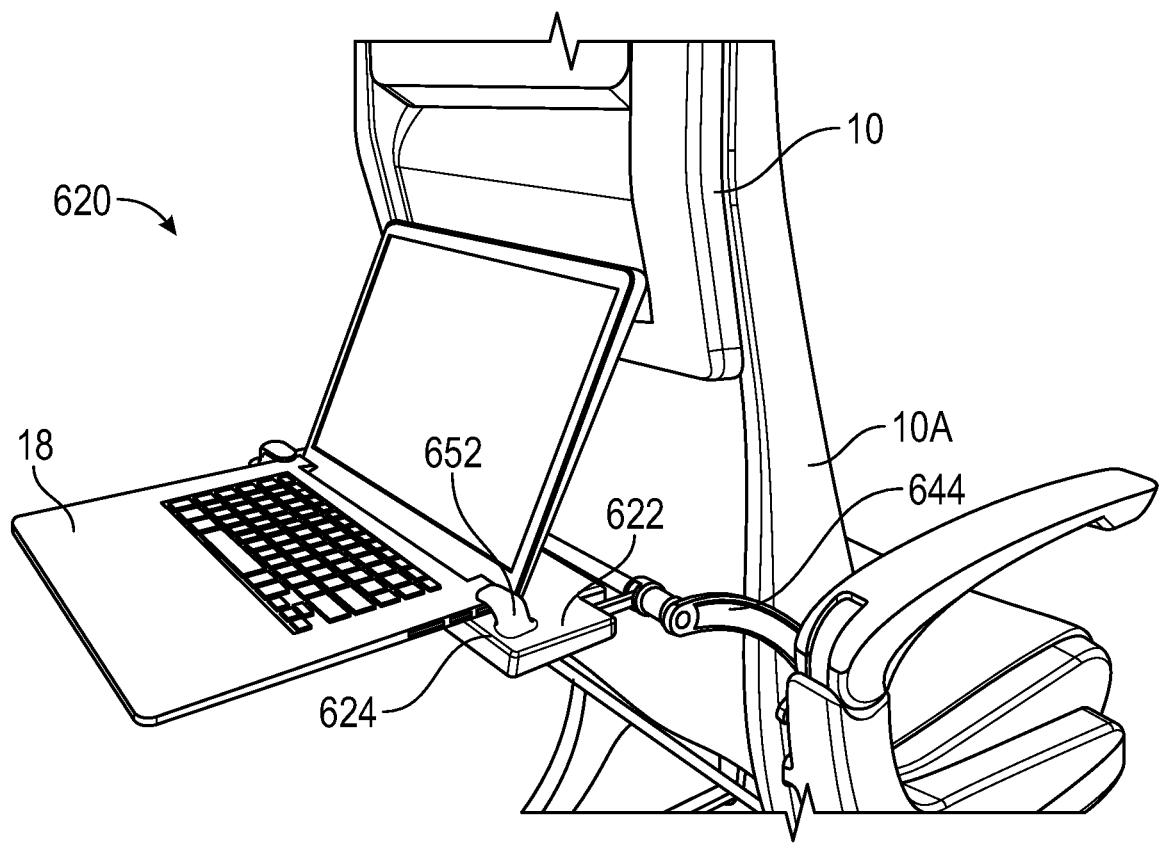
FIG. 8 is a perspective view of the tray table assembly of FIGS. 6A-6B with a PED.

FIGS. 6-8 illustrate another example of a tray table assembly 620 that is similar to the tray table assembly 20 and includes a base 622 having a receiving area 624. In this embodiment, the base 622 is a shelf that is supported by at least one arm 644. Optionally, the at least one arm 644 may be pivotably connected to the seat 10. Optionally, the base 622 is pivotable or rotatable relative to the at least one arm 644. As illustrated in FIGS. 6-8, the base 622 includes an upper surface 646, a first side 648, and a second side 650 opposite the first side 648. The particular shape of the base 622 should not be considered limiting. Optionally, the at least one arm 644 may be pivotably attached to one of the sides 648, 650, although it need not be in other embodiments.

In various embodiments, the base 622 includes one or more projections 652 that selectively engage and retain the tray table 12 in the receiving area 624. In certain aspects, each projection at least partially overlaps or covers the base 622. The particular location of each projection 652 relative to the base 622 and the number of projections 652 should not be considered limiting on the disclosure.

In some embodiments, the projections 652 are fixed (see, e.g., FIGS. 6 and 8). In other embodiments, the projections 652 are adjustable relative to the base 622 between a stowed position and a deployed position (represented by arrows A in FIGS. 6A-6B). In the stowed position, each projection 652 may be at least partially received in a recess 654 on the base 622. Optionally, in the stowed position, the projection 652 may be positioned within the recess 654 such that the projection 652 is flush with the upper surface 646 of the base 622. In the deployed position, at least a portion of the projection 652 is spaced apart from the upper surface 646, and an open space 656 is defined between the projection 652 and the upper surface 646. In the deployed position, the tray table 12, a personal electronic device (PED) 18, or other item as desired can be placed and retained between the upper surface 646 and the projection 652. When adjustable, the projections 652 may be movable between the stowed position and the deployed position via various suitable devices or mechanisms as desired. In one non-limiting example, the adjustable projection 652 may be slidably adjustable such that the adjustable projection 652 vertically slides between the stowed position and the deployed position. When the projections 652 are fixed, they may be fixed in the deployed position.

To use the tray table assembly 620, a user may optionally adjust the projection(s) 652 (when adjustable) to the deployed position from the stowed position. The user may then optionally slide the tray along the upper surface 646 of the base 622 until the tray table 12 is sufficiently supported on the base 622. The user may position the tray table 12 relative to the base 22 such that at least a portion of the tray table 12 is positioned between the projection 652 and the upper surface 646 of the base 622. Optionally, the projection 652 may then be adjusted to fit the particular height of the tray table 12 such that the tray table 12 is secured against the base 622. A similar process may be used for securing a PED 18. When the tray table 12 is positioned relative to the base 622, the bottom surface 12E of the tray table 12 may be supported by the upper surface 646 of the base 622. Optionally, sides 12C of the tray table may contact the projection(s) 652. In one embodiment, an upper portion of the sides 12C (or the raised edge or ledge 12D) and/or vertical surfaces of the sides 12C may optionally contact the projection(s) 652. To remove the tray table 12 from the tray table assembly 620, the user may perform the process described above in reverse. In other words, the user may optionally adjust the projection 652 and slide the tray table 12 away from the base 622 until the tray table 12 is removed. Once the tray table 12 has been removed, the adjustable projections 652 may optionally be returned to the retracted configuration.

Figure 9:
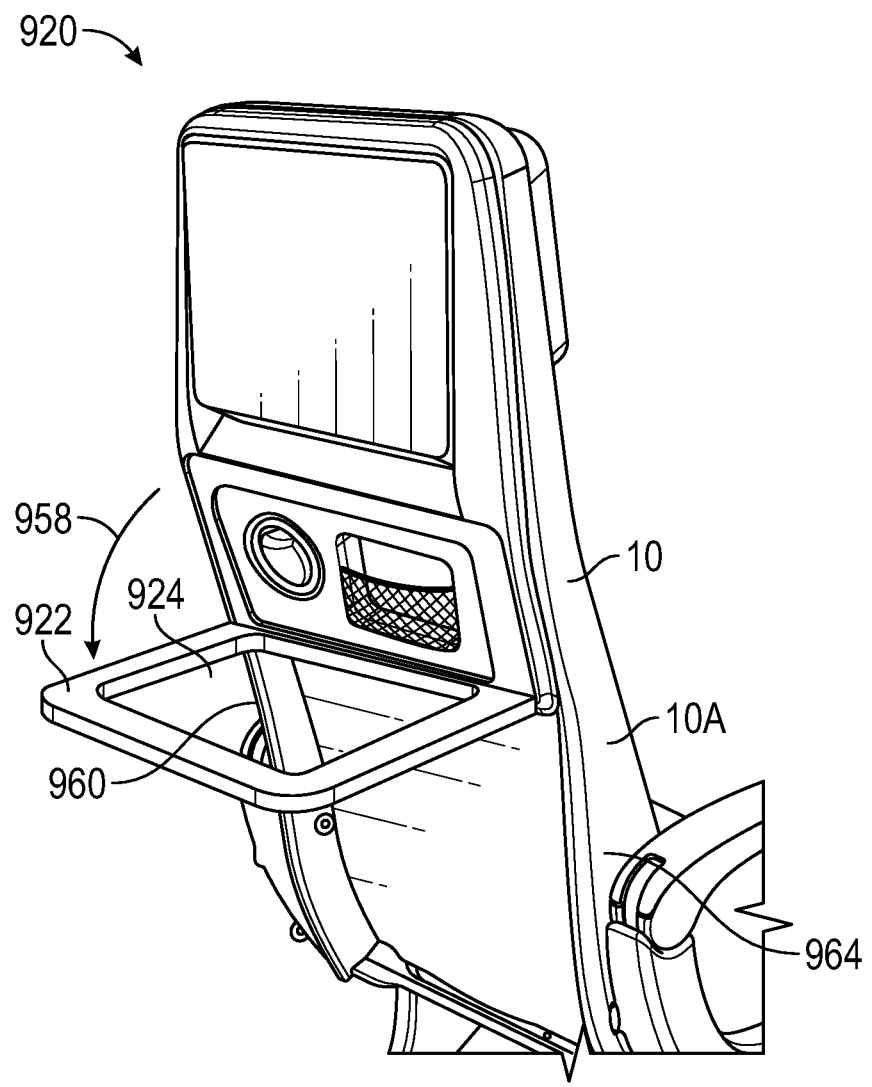
FIG. 9 is a perspective view of a tray table assembly according to further embodiments.

FIG. 9 illustrates another example of a tray table assembly 920 that is similar to the tray table assembly 20 and includes a base 922 having a receiving area 924. In this embodiment, the base 922 may be pivotably supported on the seat 10 (represented by arrow 958) and may be movable between a stowed position and a deployed position. Optionally, in the stowed position, the base 922 may be vertically positioned along the seat back 10A (e.g., extends more in a vertical direction than a forward-and-aft direction), and in the deployed position, the base 922 extends outwards from seat back 10A (e.g., extends more in the forward-and-aft direction than in the vertical direction).

The base 922 may form a perimeter, and the receiving area 924 may be an opening 960 formed within the perimeter of the base 922. The opening 960 may be sized and shaped to receive the tray table 12. The particular shape, size, and profile of the opening 960 illustrated in FIG. 9 should not be considered limiting, and the opening 960 may have various shapes, sizes, and profiles as desired.

Optionally, the tray table assembly 920 includes an adjustment mechanism 964 that maintains or adjusts the orientation of the base 922 based on movement of the seat back 10A. The adjustment mechanism may be various suitable devices or mechanisms as desired. In the embodiment of FIG. 9, the adjustment mechanism 964 is a cable coupled to a recline mechanism of the passenger seat 10. In this embodiment, the adjustment mechanism 964 may be retractable in response to movement of the seat back 10A in order to keep the base 922 oriented at a horizontal position (or other position as desired) relative to the seat back 10A of the passenger seat 10.

Figure 10:
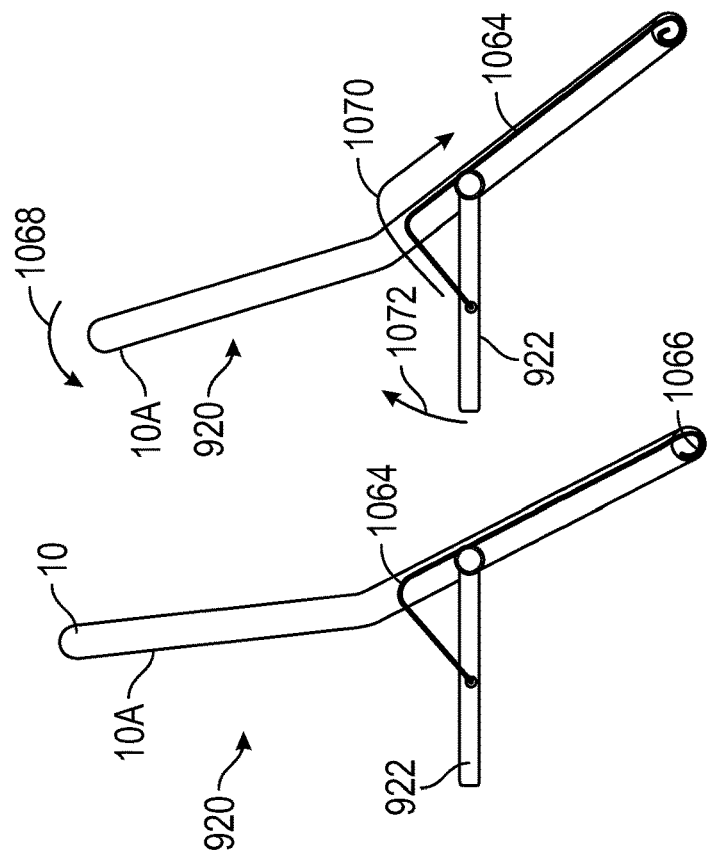
FIG. 10 is a side view of an attachment mechanism for the tray table assembly according to certain embodiments.

FIG. 10 illustrates the tray table assembly 920 with another adjustment mechanism 1064. Similar to the adjustment mechanism 964, the adjustment mechanism 1064 is a cable that is coupled to a recline mechanism 1066. As illustrated, as the seat 10 moves to a recline position (represented by arrow 1068), the cable retracts (represented by arrow 1070) such that an orientation of the base 922 is maintained (represented by arrow 1072).

Figure 11:
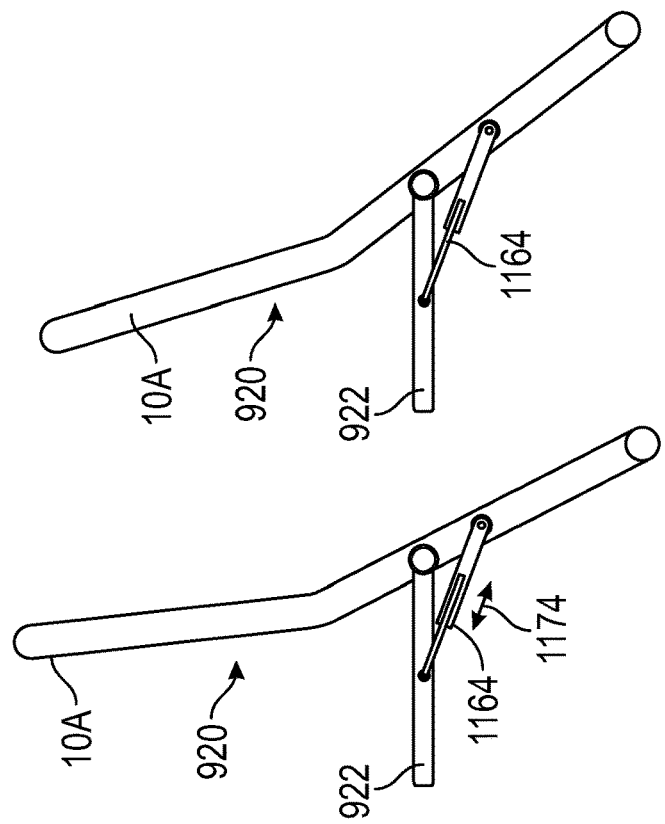
FIG. 11 is a side view of an attachment mechanism for the tray table assembly according to further embodiments.

FIG. 11 illustrates the tray table assembly 920 with another adjustment mechanism 1164. In this embodiment, the adjustment mechanism 1164 includes one or more retractable and extendable hinges (represented by arrow 1174). Optionally, the hinges are pivotably connected to the seat back 10A and the base 922. Depending on the position of the seat back 10A, the hinges may extend or retract to maintain a position of the base 922 relative to the seat back 10A during movement of the seat back 10A (e.g., recline movement) and/or as otherwise desired.

It will be appreciated that any of the above-described features are not limited to the particular tray table assemblies shown, and the features of one tray table assembly may optionally be used with another tray table assembly. As a non-limiting example, the tray table assembly 920 may optionally include the projections 652. Various other combinations of features may be utilized as desired.

In the following, further examples are described to facilitate the understanding of the invention:

Example A

A mountable tray table assembly comprising:
a base attachable to a seat back of a passenger seat via an attachment mechanism, the base comprising:
   a first side and a second side opposite the first side;
   an opening for receiving a tray table, wherein the opening includes at least one adjustable projection positioned with the opening;

wherein, when the tray table is positioned within the opening, the at least one adjustable projection contacts an end of the tray table; and wherein the attachment mechanism maintains the base at a set angle relative to a floor of a vehicle when the seat back is in an upright position and a reclined position

Example B

The mountable tray table assembly of any of the preceding or subsequent examples, wherein the attachment mechanism comprises a rotating cylinder mount.

Example C

The mountable tray table assembly of any of the preceding or subsequent examples, further comprising at least retractable arm extending from the base for supporting the tray table.

Example D

The mountable tray table assembly of any of the preceding or subsequent examples, wherein, when the tray table is positioned within the opening, less than half of the tray table is within the opening.

Example E

The mountable tray table assembly of any of the preceding or subsequent examples wherein the at least one adjustable projection comprises a retracted configuration and an extended configuration; and wherein the at least one adjustable projection is biased to the extended configuration.

Example F

The mountable tray table assembly of any of the preceding or subsequent examples, wherein the at least one adjustable projection comprises a sloped end.

Example G

The mountable tray table assembly of any of the preceding or subsequent examples, wherein, in the extended configuration, the at least one adjustable projection extends downward within the opening;

wherein, when the end of the tray table contacts the sloped end, the at least one adjustable projection moves toward the retracted configuration; and wherein, when the end of the tray table moves past the sloped end, the at least one adjustable projection returns to the extended configuration to retain the tray table within the opening.

Example H

A mountable tray table assembly comprising:
a base for receiving a tray table attachable to a seat back of a passenger seat via an attachment mechanism, the base comprising:
a horizontal portion;
a vertical portion extending upwardly from the horizontal portion; and
at least one projection extending from the vertical portion;

wherein, when the tray table is positioned within the base, a bottom surface of the tray table contacts the horizontal portion and a ledge of the tray table contacts the at least one projection.

Example I

The tray table mounting assembly of claim 8, wherein the at least one projection comprises a first projection and a second projection; and wherein the first projection is positioned on the first end of a first end of the base and the second projection is positioned at a second end of the base opposite the first end.

Example J

The tray table mounting assembly of any of the preceding or subsequent examples, wherein the at least one projection comprises a downward projecting portion; and wherein, when the tray table is positioned within the base, the ledge of the tray table contacts the downward projecting portion.

Example K

The tray table mounting assembly of any of the preceding or subsequent examples, wherein the horizontal portion extends a first distance from the vertical portion and the projection extends a second distance from the vertical portion; and wherein the first distance is greater than the second distance.

Example L

The mountable tray table assembly of any of the preceding or subsequent examples, further comprising at least retractable arm extending from the base for supporting the tray table.

Example M

The mountable tray table assembly of any of the preceding or subsequent examples, wherein, when the tray table is positioned within the base, the horizontal portion contacts less than half of the bottom surface of the tray table.

Example N

The mountable tray table assembly of any of the preceding or subsequent examples, wherein, when the tray table assembly is positioned within the base, a rear end of the tray table between a first side and a second side of the tray table is exposed.

Example O

A mountable tray table assembly comprising:
a base for receiving a tray table attachable to a seat back of a passenger seat via an attachment mechanism, the base comprising:
an upper surface;
a first side and a second side opposite the first side;
at least one adjustable projection having a vertical portion having a first end and a second end and a horizontal portion extending from the first end;

wherein the at least one adjustable projection is positioned within a recess formed on each of the first side and the second side;

wherein, when the tray table is positioned within the base, a bottom surface of the tray table contacts the upper surface of the base and a side of the tray table is positioned between the horizontal portion of the at least one adjustable projection and the upper surface of the base.

Example P

The mountable tray table assembly of any of the preceding or subsequent examples, further comprising at least retractable arm extending from the base for supporting the tray table.

Example Q

The mountable tray table assembly of claim 15, wherein the at least one adjustable projection comprises a retracted configuration and an extended configuration; and wherein, in the retracted configuration, the at least one adjustable projection is positioned within the recess such that an upper surface of the horizontal portion is flush with the upper surface of the base; and wherein, in the extended configuration, the at least one projection raised with respect to the upper surface of the base for receiving the tray table.

Example R

The mountable tray table assembly of any of the preceding or subsequent examples, wherein the at least one adjustable projection is slidably coupled to the base such that the at least one adjustable projection slides in a vertical direction between the retracted configuration and the extended configuration.

Example S

The mountable tray table assembly of any of the preceding or subsequent examples, wherein, when the tray table is positioned within the base, the side of the tray contacts the vertical portion of the at least one adjustable projection and an upper edge of the side of the tray table contacts the horizontal portion of the at least one adjustable projection.

Example T

The mountable tray table assembly of any of the preceding or subsequent examples, wherein, when the tray table is positioned within the base, the horizontal portion contacts less than half of the bottom surface of the tray table.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A mountable tray table assembly comprising:
a base attachable to a seat back of a passenger seat via an attachment mechanism, the base comprising:
a first side and a second side opposite the first side;
an opening for receiving a tray table, wherein the opening includes at least one adjustable projection positioned with the opening, and wherein the at least one adjustable projection comprises a sloped end;
wherein, when the tray table is positioned within the opening, the sloped end of the at least one adjustable projection contacts an end of the tray table; and
wherein the attachment mechanism maintains the base at a set angle relative to a floor of a vehicle when the seat back is in an upright position and a reclined position,
wherein the at least one adjustable projection comprises a retracted configuration and an extended configuration, wherein the at least one adjustable projection is biased to the extended configuration, and wherein the at least one adjustable projection comprises a sloped end.

2. The mountable tray table assembly of claim 1, wherein the attachment mechanism comprises a rotating cylinder mount.

3. The mountable tray table assembly of claim 1, further comprising at least retractable arm extending from the base for supporting the tray table.

4. The mountable tray table assembly of claim 1, wherein, when the tray table is positioned within the opening, less than half of the tray table is within the opening.

5. The mountable tray table assembly of claim 1, wherein, in the extended configuration, the at least one adjustable projection extends downward within the opening;
wherein, when the end of the tray table contacts the sloped end, the at least one adjustable projection moves toward the retracted configuration; and
wherein, when the end of the tray table moves past the sloped end, the at least one adjustable projection returns to the extended configuration to retain the tray table within the opening.

6. A mountable tray table assembly comprising:
a base for receiving a tray table attachable to a seat back of a passenger seat via an attachment mechanism, the base comprising:
a horizontal portion;
a vertical portion extending upwardly from the horizontal portion; and
at least one projection extending from the vertical portion, the at least one projection comprising a sloped surface,
wherein, when the tray table is positioned within the base, a bottom surface of the tray table contacts the horizontal portion and a ledge of the tray table contacts the sloped surface of the at least one projection.

7. The tray table mounting assembly of claim 6, wherein the at least one projection comprises a first projection and a second projection; and
wherein the first projection is positioned at a first end of the base and the second projection is positioned at a second end of the base opposite the first end.

8. The tray table mounting assembly of claim 6, wherein the at least one projection comprises a downward projecting portion; and
wherein, when the tray table is positioned within the base, the ledge of the tray table contacts the downward projecting portion.

9. The tray table mounting assembly of claim 6, wherein the horizontal portion extends a first distance from the vertical portion and the projection extends a second distance from the vertical portion; and
  wherein the first distance is greater than the second distance.

10. The mountable tray table assembly of claim 6, further comprising at least retractable arm extending from the base for supporting the tray table.

11. The mountable tray table assembly of claim 6, wherein, when the tray table is positioned within the base, the horizontal portion contacts less than half of the bottom surface of the tray table.

12. The mountable tray table assembly of claim 6, wherein, when the tray table assembly is positioned within the base, a rear end of the tray table between a first side and a second side of the tray table is exposed.

13. A mountable tray table assembly comprising:
  a base for receiving a tray table attachable to a seat back of a passenger seat via an attachment mechanism, the base comprising:
  an upper surface;
  a first side and a second side opposite the first side with respect to the mountable tray table assembly; and
  at least one adjustable projection having a vertical portion having a first end and a second end and a horizontal portion extending from the first end,
  wherein the at least one adjustable projection is positioned within a recess formed on each of the first side and the second side,
  wherein, when the tray table is positioned within the base, a bottom surface of the tray table contacts the upper surface of the base and a side of the tray table is positioned between the horizontal portion of the at least one adjustable projection and the upper surface of the base.

14. The mountable tray table assembly of claim 13, further comprising at least retractable arm extending from the base for supporting the tray table.

15. The mountable tray table assembly of claim 13, wherein the at least one adjustable projection comprises a retracted configuration and an extended configuration; and
  wherein, in the retracted configuration, the at least one adjustable projection is positioned within the recess such that an upper surface of the horizontal portion is flush with the upper surface of the base; and
  wherein, in the extended configuration, the at least one projection raised with respect to the upper surface of the base for receiving the tray table.

16. The mountable tray table assembly of claim 15, wherein the at least one adjustable projection is slidably coupled to the base such that the at least one adjustable projection slides in a vertical direction between the retracted configuration and the extended configuration.

17. The mountable tray table assembly of claim 13, wherein, when the tray table is positioned within the base, the side of the tray contacts the vertical portion of the at least one adjustable projection and an upper edge of the side of the tray table contacts the horizontal portion of the at least one adjustable projection.

18. The mountable tray table assembly of claim 13, wherein, when the tray table is positioned within the base, the horizontal portion contacts less than half of the bottom surface of the tray table.

19. The mountable tray table assembly of claim 1, wherein the at least one adjustable projection is configured to be moved from the extended configuration to the retracted configuration in response to contact between the sloped end and the end of the tray table.

* * * * *